United States Patent
Jie

(10) Patent No.: US 11,816,877 B2
(45) Date of Patent: Nov. 14, 2023

(54) METHOD AND APPARATUS FOR OBJECT DETECTION IN IMAGE, VEHICLE, AND ROBOT

(71) Applicant: TENCENT TECHNOLOGY (SHENZHEN) COMPANY LIMITED, Shenzhen (CN)

(72) Inventor: Zequn Jie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 198 days.

(21) Appl. No.: 17/393,366

(22) Filed: Aug. 3, 2021

(65) Prior Publication Data
US 2021/0365726 A1     Nov. 25, 2021

Related U.S. Application Data

(63) Continuation of application No. PCT/CN2020/085836, filed on Apr. 21, 2020.

(30) Foreign Application Priority Data

May 28, 2019  (CN) .......................... 201910453298.4

(51) Int. Cl.
*G06V 10/44*     (2022.01)
*G06F 18/213*    (2023.01)
(Continued)

(52) U.S. Cl.
CPC .......... *G06V 10/454* (2022.01); *G06F 18/213* (2023.01); *G06F 18/22* (2023.01);
(Continued)

(58) Field of Classification Search
CPC .. G06V 10/454; G06V 10/758; G06V 10/761; G06V 10/764; G06V 10/771;
(Continued)

(56) References Cited

U.S. PATENT DOCUMENTS

| | | | |
|---|---|---|---|
| 2015/0030251 A1* | 1/2015 | Hasegawa | G06V 20/584 382/195 |
| 2019/0266784 A1* | 8/2019 | Singh | G06N 3/063 |
| 2020/0175375 A1* | 6/2020 | Chen | G06T 7/187 |

FOREIGN PATENT DOCUMENTS

| | | | |
|---|---|---|---|
| CN | 107945207 A | * 4/2018 | G06K 9/00 |
| CN | 107945207 A | 4/2018 | |

(Continued)

OTHER PUBLICATIONS

The World Intellectual Property Organization (WIPO) International Search Report for PCT/CN2020/085836 dated Jul. 22, 2020 5 Pages (including translation).

(Continued)

*Primary Examiner* — Dhaval V Patel
(74) *Attorney, Agent, or Firm* — ANOVA LAW GROUP PLLC

(57) ABSTRACT

This application discloses a method and apparatus for object detection in an image, a vehicle, and a robot. The method for object detection in an image is performed by a computing device. The method includes determining an image feature of an image; determining a correlation of pixels in the image based on the image feature; updating the image feature of the image based on the correlation to obtain an updated image feature; and determining an object detection result in the image according to the updated image feature.

17 Claims, 6 Drawing Sheets

(51) Int. Cl.
  *G06F 18/22* (2023.01)
  *G06F 18/25* (2023.01)
  *G06V 10/75* (2022.01)
  *G06V 10/74* (2022.01)
  *G06V 10/764* (2022.01)
  *G06V 10/771* (2022.01)
  *G06V 10/80* (2022.01)
  *G06V 20/56* (2022.01)
  *G06V 20/10* (2022.01)

(52) U.S. Cl.
  CPC .......... *G06F 18/253* (2023.01); *G06V 10/758* (2022.01); *G06V 10/761* (2022.01); *G06V 10/764* (2022.01); *G06V 10/771* (2022.01); *G06V 10/806* (2022.01); *G06V 20/10* (2022.01); *G06V 20/56* (2022.01)

(58) Field of Classification Search
  CPC ...... G06V 10/806; G06V 20/10; G06V 20/56; G06V 10/462; G06F 18/213; G06F 18/22; G06F 18/253; G06F 18/211
  See application file for complete search history.

(56) References Cited

FOREIGN PATENT DOCUMENTS

| | | |
|---|---|---|
| CN | 109427067 A | 3/2019 |
| CN | 110163221 A | 8/2019 |
| JP | 3720723 B2 | 11/2005 |

OTHER PUBLICATIONS

Tsung-Yi Lin et al., "Feature Pyramid Networks for Object Detection," arXiv:1612.03144v2, Apr. 19, 2017. 10 pages.
Hengshuang Zhao et al., "Pyramid Scene Parsing Network," arXiv:1612.01105v2, Apr. 27, 2017. 11 pages.

* cited by examiner

METHOD AND APPARATUS FOR OBJECT DETECTION IN IMAGE, VEHICLE, AND ROBOT

RELATED APPLICATIONS

This application is a continuation application of PCT Application No. PCT/CN2020/085836, entitled "METHOD AND APPARATUS FOR DETECTING OBJECT IN IMAGE, AND VEHICLE AND ROBOT" and filed on Apr. 21, 2020, which in turn claims priority to Chinese Patent Application No. 201910453298.4, entitled "METHOD AND APPARATUS FOR OBJECT DETECTION IN IMAGE, VEHICLE, AND ROBOT" filed with the National Intellectual Property Administration, PRC on May 28, 2019. The two applications are both incorporated herein by reference in their entirety.

FIELD OF THE TECHNOLOGY

This application relates to the field of image processing, and specifically, to a method and apparatus for object detection in an image, a vehicle, a robot, and a monitoring device.

BACKGROUND OF THE DISCLOSURE

When a user is viewing an image, contents that the user pay attention to are different depending on different contents displayed in the image. Which object the user is most likely to pay attention to in any image may be predicted by using an algorithm. This process is also referred to as salient object detection. A purpose of the salient object detection is to extract the object that attracts most attention in a given image. For example, the salient object detection may be performed in a process of target detection and positioning of an unmanned vehicle, target detection of a robot, target detection of a live streaming video, or target detection of security monitoring.

Often, when salient object detection is performed on frames of a video by using some existing salient object detection algorithms, only image information of a single frame is considered and time continuity of different frames of the video is neglected. In other salient object detection algorithms, although the time continuity of the video is considered, computational complexity of the algorithms is high.

SUMMARY

An objective of this application is to provide a method, device, and apparatus for object detection in an image, a storage medium, a vehicle, a robot, and a monitoring device.

One aspect of this application provides a method for object detection in an image is performed by a computing device. The method includes determining an image feature of an image; determining a correlation of pixels in the image based on the image feature; updating the image feature of the image based on the correlation to obtain an updated image feature; and determining an object detection result in the image according to the updated image feature.

Another aspect of this application provides an image monitoring device. The image monitoring device includes an image sensor, configured to capture an image; a memory, configured to store an instruction; and a processor, configured to perform a method for object detection. The method includes determining an image feature of an image; determining a correlation of pixels in the image based on the image feature; updating the image feature of the image based on the correlation to obtain an updated image feature; and determining an object detection result in the image according to the updated image feature.

According to still another aspect of this application, a non-transitory computer-readable storage medium is further provided, storing an instruction, the instruction, when executed by a processor, causing the processor to perform the foregoing method.

According to still another aspect of this application, an object detection device is further provided, including: an image sensor, configured to capture an image; a memory, configured to store an instruction; and a processor, configured to perform the foregoing method on the captured image by executing the instruction.

By using the method, device, and apparatus for object detection in an image, the storage medium, the vehicle, the robot, and the monitoring device provided in this application, object detection may be performed in an image by determining correlation between pixels in the image and/or correlation between pixels in the image and pixels in another image, and based on the determined correlation. By considering characteristics of the foregoing correlation, the accuracy of object detection in the image is improved, and the speed of a detection algorithm when considering time continuity of a video is increased.

BRIEF DESCRIPTION OF THE DRAWINGS

To describe the technical solutions in embodiments of this application more clearly, the following briefly describes accompanying drawings required for describing the embodiments. Apparently, the accompanying drawings in the following description show merely some embodiments of this application, and a person of ordinary skill in the art can still derive other drawings from these accompanying drawings without creative efforts. The following accompanying drawings are not deliberately drawn to scale according to the actual size, and a focus is demonstrating the main idea of this application.

DESCRIPTION OF EMBODIMENTS

Figure 1:
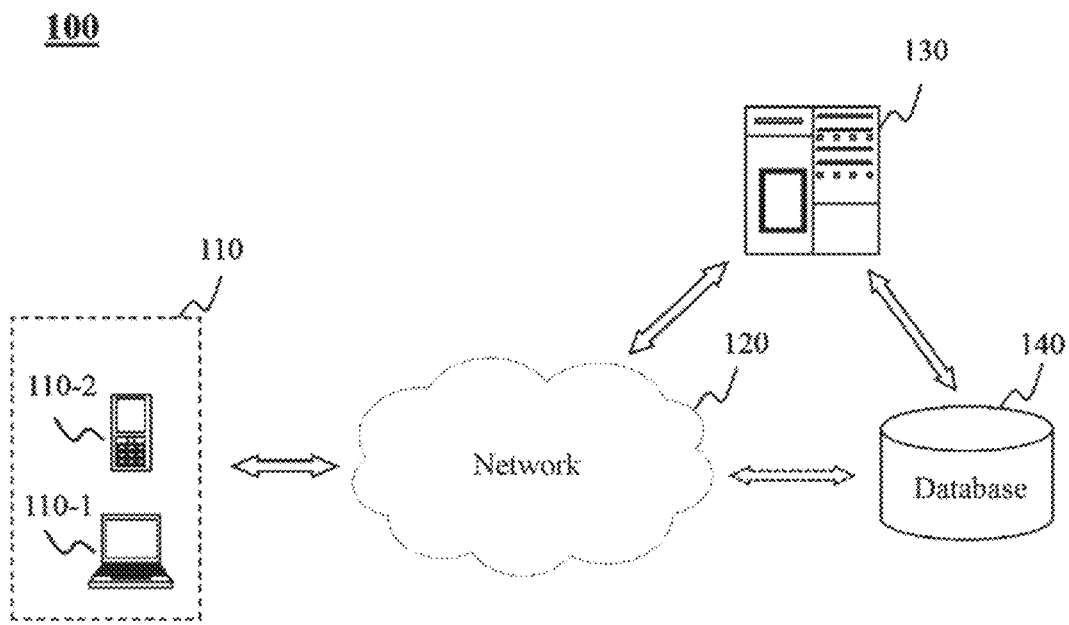
FIG. 1 is a diagram of an image processing system according to this application.

To make the objectives, technical solutions, and advantages of the embodiments of this application more comprehensible, the following clearly and completely describes the technical solutions in the embodiments of this application with reference to the accompanying drawings in the embodiments of this application. Apparently, the described embodiments are a part rather than all of the embodiments of this application. All other embodiments obtained by a person of ordinary skill in the art based on the embodiments of this application without creative efforts shall fall within the protection scope of this application.

Unless otherwise defined, the technical terms or scientific terms used herein should have general meanings understood by a person of ordinary skill in the field of this application. The "first", the "second", and similar terms used in this application do not indicate any order, quantity or significance, but are used to only distinguish different components. Similarly, "include", "including", or similar terms mean that elements or items appearing before the term cover elements or items listed after the term and their equivalents, but do not exclude other elements or items. A similar term such as "connect" or "connection" is not limited to a physical or mechanical connection, but may include an electrical connection, whether direct or indirect. "Up", "down", "left", "right", and the like are merely used for indicating relative positional relationships. When absolute positions of described objects change, the relative positional relationships may correspondingly change.

A position of a salient object in an image, that is, a region that a user is most likely to be interested in when viewing the image, may be predicted according to image information. Often, the salient object in the image may be predicted by using an LC algorithm, an HC algorithm, and the like. Specifically, salience of pixels may be predicted by, for example, determining a sum of distances in color between certain pixels in the image and other pixels in the image.

However, it is not possible to predict a region of the salient object in the image based on correlation between pixels of the image.

In addition, in a process of performing salient object prediction on an image frame of a video, only image information of a single frame is considered, or a recurrent neural network (RNN) is required to be used to transmit visual information of different frames, to consider time continuity of different frames. Due to a huge amount of calculation and a great time complexity of an algorithm based on the RNN, a calculation speed of the algorithm is relatively low.

The present application provides a method for predicting an object of a preset type in an image, for example, an object of a specific type or a salient object, based on correlation between pixels and other pixels in the image and/or correlation between pixels in an image frame of a video and pixels in another image frame of the video.

FIG. 1 is a diagram of an image processing system according to this application. As shown in FIG. 1, the image processing system 100 may include a user terminal 110, a network 120, a server 130, and a database 140.

The user terminal 110 may be, for example, a computer 110-1 and a mobile phone 110-2 shown in FIG. 1. As can be understood, in embodiments consistent with the present application, the user terminal may be any other type of electronic device that can perform data processing, which may include, but is not limited to, a desktop computer, a notebook computer, a tablet computer, a smartphone, a smart home device, a wearable device, an in-vehicle electronic device, a monitoring device, and the like. The user terminal may alternatively be any equipment provided with electronic devices, such as a vehicle or a robot.

The user terminal provided in this application may be configured to receive an image or a video to be processed and perform object detection on the image or a frame of the video by using a method provided in this application. In an example, the user terminal may acquire the video to be processed by using an image acquisition device (such as a camera or a video camera) configured on the user terminal. In another example, the user terminal may receive the video to be processed from a separately configured image acquisition device. In still another example, the user terminal may receive the video to be processed from a server through a network, for example, receive a video stream sent from the server.

In some embodiments, object detection may be performed by using a processing unit of the user terminal. In some embodiments, the user terminal may perform object detection on an image by using an application program built in the user terminal. In some embodiments, the user terminal may perform object detection on an image by calling an application program stored outside the user terminal.

In some other embodiments, the user terminal sends the received image to be processed to the server 130 through the network 120, and the server 130 performs object detection on the image. In some embodiments, the server 130 may perform object detection on the image by using an application program built in the server. In some embodiments, the server 130 may perform object detection on the image by calling an application program stored outside the server.

The network 120 may be a single network, or a combination of at least two different networks. For example, the network 120 may include, but is not limited to, one or a combination of some of a local area network, a wide area network, a public network, a private network, and the like.

The server 130 may be a single server or a server cluster. Servers in the cluster are connected by a wired or wireless network. A server cluster may be centralized, for example, a data center, or may be distributed. The server 130 may be local or remote.

The database 140 may generally refer to a device with a storage function. The database 140 is mainly configured to store data used, generated, and outputted by the user terminal 110 and the server 130 in work. The database 140 may be local or remote. The database 140 may include various memories, such as a random access memory (RAM) and a read-only memory (ROM). The storage devices mentioned above are just some examples, and the storage devices that may be used in the system are not limited to these.

The database 140 may be connected to or communicate with the server 130 or a part thereof by the network 120, or may be directly connected to or communicate with the server 130, or may be a combination of the foregoing two methods.

The system provided in FIG. 1 may be used to perform object detection on each frame of an image or a video, such as salient object detection or another predesignated object detection. The salient object refers to an object that a user pays most attention to when viewing an image. Correlation between pixels in an image (for example, correlation between a pixel in the image and another pixel in the image) is determined by using information in the image, and/or correlation between pixels in an image and pixels in another image is determined by using information in the image and another image (for example, an adjacent frame of a video), which can improve the accuracy of object detection.

The following describes a procedure of a method for object detection in an image provided in this application in detail.

Figure 2:
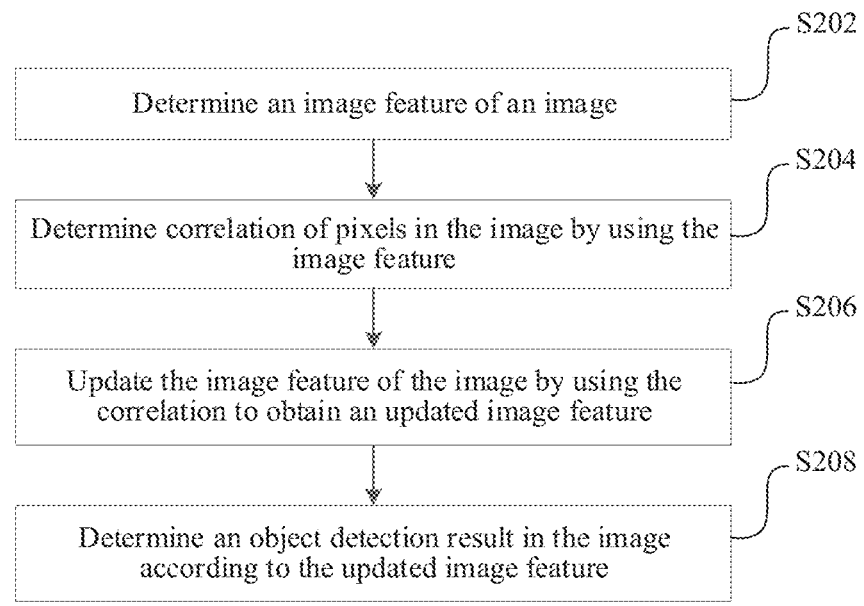
FIG. 2 is a schematic flowchart of a method for object detection in an image according to an embodiment of this application.

FIG. 2 is a schematic flowchart of a method for object detection in an image according to an embodiment of this application. The method shown in FIG. 2 may be performed by a computing device shown in FIG. 8.

As shown in FIG. 2, in step S202, an image feature of an image may be determined. In some embodiments, the image may be inputted into a deep neural network, and an output of the deep neural network may be used as the image feature of the image. In some embodiments, the deep neural network may include an input layer, an intermediate layer including a plurality of convolution layers, and an output layer. A plurality of times of convolution processing performed in the image by using the deep neural network can determine the image feature including semantic information of the image, which achieves object detection in the image. For example, the image may be processed by using a network structure such as a residual network ResNet and a VGG network, and the image feature of the image is determined. For example, a plurality of layers (layer 1 to layer n−1) of pyramid features $P_1, P_2, \ldots,$ and $P_{n-1}$ may be obtained by using a feature pyramid network (FPN), and a feature of layer n of the FPN is processed through a pyramid pooling module (PPM) to determine an image feature $P_n$ of the image. A person skilled in the art can understand that this application does not limit a method for determining the image feature, and may use any machine learning algorithm to determine the image feature, without departing from the principles of this application.

In step S204, correlation of pixels in the image may be determined by using the image feature.

In some embodiments, the correlation of pixels in the image refers to the correlation between the pixels in the image, that is, the correlation between any pixel in the image and another pixel in the image. The image may be any single image or a frame of a video. In an example, when the image is a single image, the correlation between the pixels in the image may refer to the correlation of the pixels within the image. In another example, when the image is a frame of a video, the correlation between the pixels in the image may refer to the correlation of the pixels within the frame.

In some other embodiments, the correlation of the pixels in the image refers to inter-image correlation between the pixels in the image and the pixels in another image. Another image may be any image. For example, when the image is a frame of a video, the correlation between the pixels in the image and the pixels in another image may refer to correlation between pixels in the frame and pixels in another frame of the video, that is, the correlation of cross-frame pixels. Correlation between pixels in the frame and pixels in an adjacent frame may be determined by determining a reference image feature of the adjacent frame of the frame in the video and according to the image feature and the reference image feature.

Another frame of the video may refer to an adjacent frame (such as a previous frame or a next frame) of the frame of the video, or may refer to a frame that is not adjacent to, but is related to, the frame of the video, for example, any frame that is similar to the frame of the video. The "similar" may refer to display of similar objects, colors, composition, and the like. By considering the correlation between the pixels in the frame of the video and the pixels in another frame of the video, information transmission between different frames can be achieved. Missing visual information of some frames may be added and restored by using information of other frames to achieve enhancement and integration of detection results.

In the following, two adjacent frames of a video are used as an example to describe a principle of determining inter-image correlation provided in this application. Therefore, in the following, the inter-image correlation is also referred to as cross-frame correlation.

In some embodiments, the correlation of the pixels in the image may be represented as a form of a correlation matrix, and a value of each element in the correlation matrix may be used to indicate a magnitude of the correlation between two pixels. As can be understood, the correlation of the pixels in the image may alternatively be represented in any other manners. In the following, a method for determining the correlation of the pixels in the image is described in detail in FIG. 4 and FIG. 5.

In step S206, the image feature of the image may be updated by using the correlation to obtain an updated image feature.

In some embodiments, the determined image feature in step S202 may be updated by using the determined correlation of the pixels in the image in step S204, so that the updated image feature can be obtained for further detection steps. The updated image feature integrates semantic information of the image and correlation information about the pixels in the image. When the correlation of the pixels in the image includes the correlation between each of the pixels in the image, the image feature is updated by using the correlation, which can fully consider a global feature of the image, thereby improving the accuracy of object detection. When the correlation of the pixels in the image includes the correlation between the pixels in the image and the pixels in another image, the image feature is updated by using the correlation, which can achieve information transmission between different images. For example, when the foregoing correlation is the correlation between pixels of two adjacent frames of a video, the image feature is updated by using the correlation. Thus, the updated image feature would reflect time continuity between different frames of the video, thereby improving the accuracy of object detection.

When the correlation of the pixels in the image is represented as the correlation matrix, the image feature may be multiplied by the correlation matrix to obtain the updated image feature.

When the image feature is represented as a tensor form with a size of H*W and a quantity of channels of C, the image feature may be multiplied by the correlation matrix through the following process: the image feature may be rearranged, and the image feature in a form of a three-dimensional tensor is compressed into a form of a two-dimensional image feature matrix with a dimension of HW*C. The rearranged image feature may be matrix multiplied by the correlation matrix to obtain an updated image feature matrix. Next, an inverse operation of rearrangement may be performed on the updated image feature matrix to obtain the updated image feature.

H and W represent sizes of the image feature in a height direction and a width direction respectively, and the size may be a size in the unit of a quantity of pixels.

In a process of rearranging the image feature tensor with the size of H*W and the quantity of channels of C into the two-dimensional image feature matrix of HW*C, a quantity of elements in the image feature does not change. Therefore, each element in the image feature tensor may be mapped to the two-dimensional image feature matrix according to a preset order, thereby achieving rearrangement. In this case, each element in the two-dimensional image feature matrix may also be mapped back to the image feature tensor according to a mapping rule of rearrangement, thereby achieving an inverse operation of rearrangement.

In step S208, an object detection result in the image may be determined according to the updated image feature. The object detection result may include a probability that each pixel in the image pertains to an object of a preset type. In an example, the object of a preset type may refer to any object of a specific type (such as a human face, an animal, and a plant). In another example, the object of a preset type may refer to an object that a user is interested in when viewing an image.

In some embodiments, a detection image feature may be determined at least based on the updated image feature, and the object detection result of the image may then be generated according to the detection image feature.

In some embodiments, the object detection result of the image may be generated in a corresponding method of determining the image feature of the image in step S202. For example, if in step S202, a convolutional neural network is used to process the image and the image feature of the image is obtained, then in step S208, the convolutional neural network may correspondingly be used to process the detection image feature, to obtain the object detection result of the image. If in step S202, another method is used to obtain the image feature of the image, then in step S208, a corresponding method is also used to process the detection image feature to obtain the object detection result of the image.

In some embodiments, a detection result graph of the image may be determined according to the object detection result. For each pixel in the detection result graph, a corresponding pixel of the pixels in the image and a probability that the corresponding pixel pertains to an object of a preset type are determined, and a pixel value of the pixel is determined according to the probability. For example, when the probability that the corresponding pixel pertains to the object of the preset type is greater than (or equal to) a preset threshold (for example, 0.5, or any other probability value), the pixel value of the pixel may be determined as a first value (for example, 1). When the probability that the corresponding pixel pertains to the object of the preset type is less than the preset threshold, the pixel value of the pixel may be determined as a second value (for example, 0). A person skilled in the art may determine a magnitude of the preset threshold and values of the first value and the second value.

In some embodiments, the detection image feature may include at least the updated image feature. In one embodiment, the detection image feature may be the updated image feature obtained in step S206. In another implementation, the detection image feature may alternatively be determined according to the updated image feature and an additional image feature of the image.

In some embodiments, the additional image feature may be any one of the pyramid features $P_1, P_2, \ldots,$ and $P_{n-1}$ determined in step S202. In some embodiments, the additional image feature may be any other feature determined according to the method provided in step S202.

For example, an example in which the image feature is determined by using the ResNet network in step S202 is used, the additional image feature may be determined according to a result outputted by an intermediate layer of the ResNet network. At least one additional image feature may be determined by using results outputted by different convolutional layers in the intermediate layer of the ResNet network, and each of the at least one additional image feature is different from one another. For example, each additional image feature may have a different size and a different quantity of channels.

In an example, the updated image feature and the additional image feature of the image may be combined to determine the detection image feature. For example, the updated image feature and the additional image feature of the image may be connected in a channel dimension to determine the detection image feature. A person skilled in the art can understand that the updated image feature and the additional image feature may alternatively be combined in any other manner. As long as information of the updated image feature and information of the additional image feature can be integrated, this application is not limited to a specific method of combination.

In another example, the updated image feature may be superimposed on at least one additional image feature to obtain at least one superimposed image feature, and the updated image feature and the at least one superimposed image feature are combined to determine the detection image feature. For example, the updated image feature and the superimposed image feature may be connected in a channel dimension to determine the detection image feature.

When sizes and quantities of channels of the updated image feature and the additional image feature to be superimposed are the same, values of corresponding elements in the updated image feature and the additional image feature may be added to obtain the superimposed image feature. When sizes and quantities of channels of the updated image feature and the additional image feature are different, upsampling/downsampling may be performed on at least one of the updated image feature and the additional image feature to equalize the sizes of the updated image feature and the additional image feature, and at least one of the updated image feature and the additional image feature may further be processed by using a convolution kernel with a size of 1×1 to equalize the quantities of channels of the updated image feature and the additional image feature. The updated image feature and the additional image feature can have the same size and quantity of channels by using such method, and the superimposed image feature can be obtained by the method of adding the values of corresponding elements.

Figure 3A:
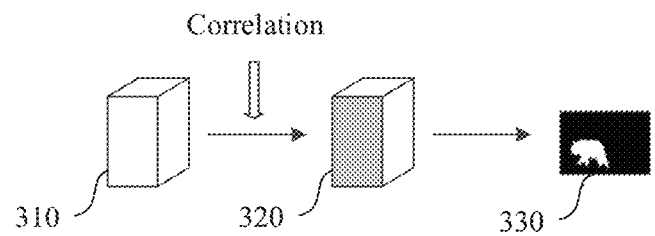
FIG. 3A shows a schematic process of determining a detection image feature according to an updated image feature.

FIG. 3A shows a schematic process of determining a detection image feature according to an updated image feature.

As shown in FIG. 3A, an image feature 310 may be updated by using the determined correlation in step S204, and an updated image feature is determined as a detection image feature 320. An object detection result 330 in the image may be determined by performing, for example, convolution processing on the detection image feature.

Figure 3B:
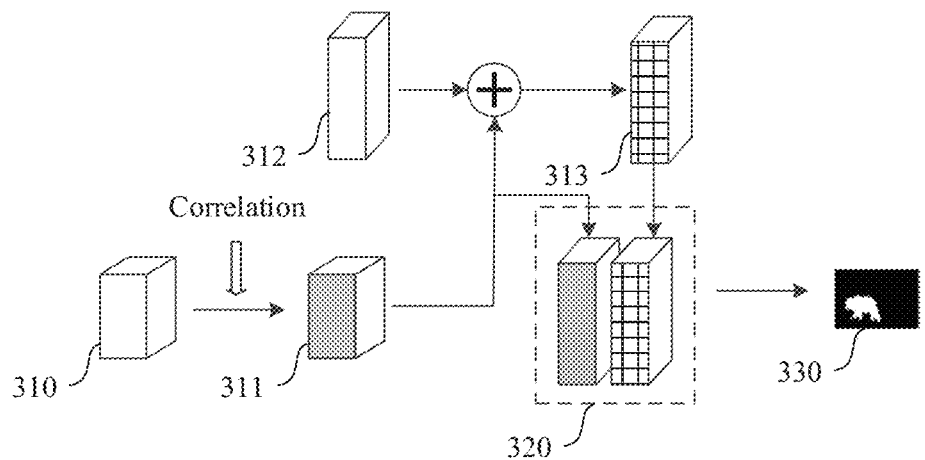
FIG. 3B shows another schematic process of determining a detection image feature according to an updated image feature.

FIG. 3B shows another schematic process of determining a detection image feature according to an updated image feature.

As shown in FIG. 3B, an image feature 310 may be updated by using the determined correlation in step S204, and an updated image feature 311 is obtained. A superimposed image feature 313 may be obtained by superimposing the updated image feature 311 on an additional image feature 312. A detection image feature 320 may be determined by combining the superimposed image feature 313 and the updated image feature 311. For example, the superimposed image feature 313 and the updated image feature 311 may be connected in a channel dimension to determine the detection image feature 320. When sizes of the updated image feature 311 and the additional image feature 312 are different, upsampling/downsampling may be performed on at least one of the updated image feature 311 and the additional image feature 312 to equalize the sizes of the updated image feature 311 and the additional image feature 312. Next, values of corresponding elements in the updated image feature 311 and the additional image feature 312 that have a same size may be added to implement superimposition of the updated image feature 311 and the additional image feature 312.

When sizes of the superimposed image feature 313 and the updated image feature 311 are different, upsampling/downsampling may be performed on at least one of the superimposed image feature 313 and the updated image feature 311 to equalize the sizes of the superimposed image feature 313 and the updated image feature 311. Next, the superimposed image feature and the updated image feature that have a same size may be connected in a channel dimension to determine the detection image feature 320.

An object detection result 330 in the image may be determined by performing, for example, convolution processing on the detection image feature.

Although only one additional image feature 312 is shown in FIG. 3B, a person skilled in the art can understand that, when there are a plurality of additional image features, the plurality of additional image features may be processed separately by using the same method. For example, the updated image feature may be superimposed on the plurality of additional image features respectively to obtain a plurality of superimposed image features. The detection image feature 320 may be determined by combining the plurality of superimposed image features and the updated image feature.

Figure 3C:
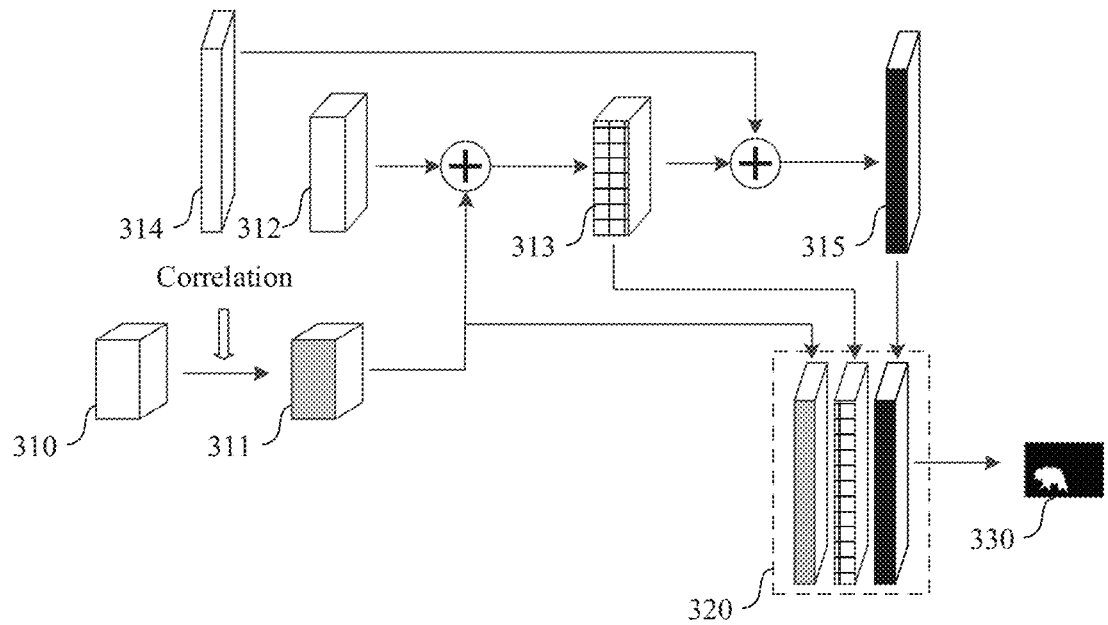
FIG. 3C shows still another schematic process of determining a detection image feature according to an updated image feature.

FIG. 3C shows still another schematic process of determining a detection image feature according to an updated image feature.

As shown in FIG. 3C, an image feature 310 may be updated by using the determined correlation in step S204, and an updated image feature 311 is obtained. A superimposed image feature 313 may be obtained by superimposing the updated image feature 311 on an additional image feature 312.

Further, another additional image feature 314 may be superimposed on the superimposed image feature 313 to determine another superimposed image feature 315.

A detection image feature 320 may be determined by combining the superimposed image feature 313, the superimposed image feature 315, and the updated image feature 311. For example, the superimposed image feature 313, the superimposed image feature 315, and the updated image feature 311 may be connected in a channel dimension to determine the detection image feature 320.

When sizes of the superimposed image feature 313, the superimposed image feature 315, and the updated image feature 311 are different, upsampling/downsampling may be performed on at least one of the superimposed image feature 313, the superimposed image feature 315, and the updated image feature 311 to equalize the sizes of the superimposed image feature 313, the superimposed image feature 315, and the updated image feature 311. Next, the superimposed image feature and the updated image feature that have a same size may be connected in a channel dimension to determine the detection image feature 320.

An object detection result 330 in the image may be determined by performing, for example, convolution processing on the detection image feature.

A person skilled in the art can understand that, when there is a plurality of additional image features, the plurality of additional image features may be processed separately by using the same principle. For example, the superimposed image feature may be further superimposed on other additional image features to obtain more superimposed image features. The detection image feature 320 may be determined by combining the plurality of superimposed image features and the updated image feature.

A person skilled in the art can understand that the updated image feature and the additional image feature may be superimposed in any manner without departing from the principles of this application. The updated image feature and any quantity of additional image features may be superimposed to determine a plurality of superimposed image features that integrate different information. For example, a combination of the detection image features obtained by the methods shown in FIG. 3A to FIG. 3C may alternatively be used to generate a final detection result. This application is not limited to a specific method of determining the superimposed image feature.

Figure 4:
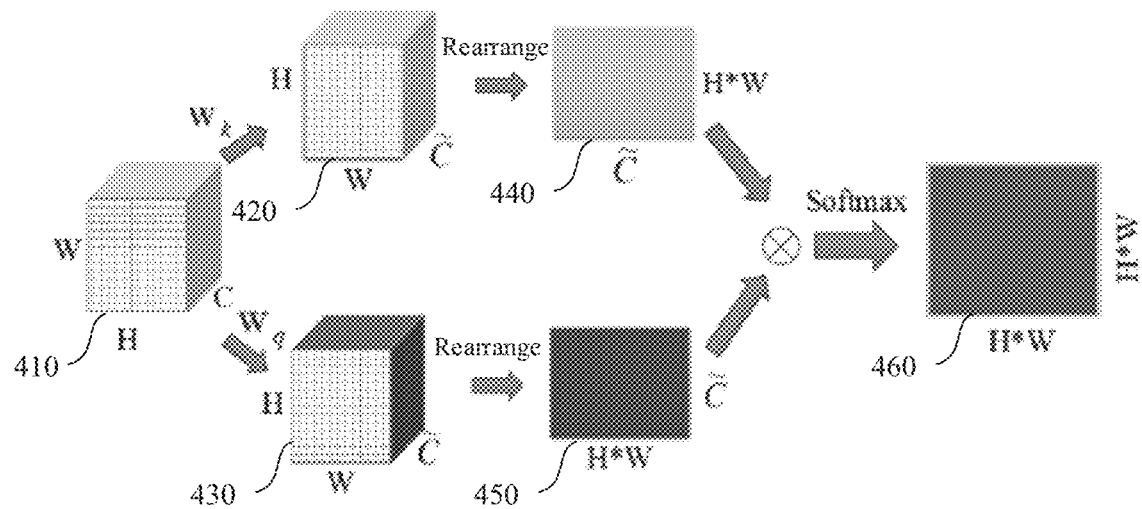
FIG. 4 shows a schematic process of a method for determining correlation of pixels in an image according to an embodiment of this application.

FIG. 4 shows a schematic process of a method for determining correlation of pixels in an image according to an embodiment of this application.

FIG. 4 shows a process of determining correlation between pixels in an image according to an image feature. As shown in FIG. 4, for an image feature 410, a size is H*W, and a quantity of channels is C. H and W represent sizes of the image feature in a height direction and a width direction respectively, and the size may be a size in the unit of a quantity of pixels. In some embodiments, a correlation matrix that indicates the correlation between the pixels in the image may be determined according to the image feature, and a dimension of the correlation matrix is HW*HW. That is, quantities of rows and columns of the correlation matrix is equal to a quantity of the pixels in the image. Therefore, values of elements of each row (or each column) in the correlation matrix may be used to represent correlation between a pixel in the image and other pixels in the image. For example, a value of an element in an $i^{th}$ row and a $j^{th}$ column in the correlation matrix may represent correlation between the $i^{th}$ pixel and the $j^{th}$ pixel in the image. i and j are pixel order numbers determined after the pixels in the image feature are rearranged in a predefined order.

As shown in FIG. 4, functions $W_k$ and $W_q$ may be used to transform the image feature 410. $W_k$ and $W_q$ may be the same, or may be different. In some embodiments, $W_k$ and $W_q$ may be a linear transformation function. In one embodiment, $W_k$ and $W_q$ may be a convolutional layer or a convolutional neural network formed by a convolutional layer.

A first transformed feature 420 may be obtained by processing (for example, by performing linear transformation) the image feature 410 using $W_k$. A second transformed feature 430 may be obtained by processing (for example, by performing linear transformation) the image feature 410 using $W_q$. As shown in FIG. 4, for the first transformed feature 420 and the second transformed feature 430, a size is H*W, and a quantity of channels is $\tilde{C}$. Next, the first transformed feature 420 and the second transformed feature 430 may be rearranged respectively to determine a first rearranged feature 440 and a second rearranged feature 450. In one embodiment, the first rearranged feature 440 and the second rearranged feature 450 may be implemented as a form of a matrix. For example, as shown in FIG. 4, the first rearranged feature 440 and the second rearranged feature 450 may be a matrix with a dimension of $\tilde{C}*HW$ and a matrix with a dimension of $HW*\tilde{C}$ respectively.

The correlation matrix that indicates the correlation between the pixels in the image may be determined by using the first rearranged feature 440 and the second rearranged feature 450. For example, matrix multiplication may be performed on the first rearranged feature 440 and the second rearranged feature 450 to obtain an autocorrelation matrix 460 with a dimension of HW*HW.

In some embodiments, elements of each column in a result S obtained by performing matrix multiplication on the first rearranged feature 440 and the second rearranged feature 450 may be normalized, so that a sum of correlation of each pixel and the pixel in the image is 1. The normalization operation may be performed by using a SoftMax function, and a normalized autocorrelation matrix M may be represented as:

$$M_{ij} = \frac{\exp(s_{ij})}{\sum_{j=1}^{n} \exp(s_{ij})} \quad (1)$$

where $M_{ij}$ represents an element in the $i^{th}$ row and the $i^{th}$ column in the autocorrelation matrix, $S_{ij}$ represents an element in the $i^{th}$ row and the $j^{th}$ column in the result obtained by performing matrix multiplication on the first rearranged feature and the second rearranged feature, and n is a quantity of rows of matrix S, in an example shown in FIG. 4, n=HW.

Although FIG. 4 shows an example of determining the correlation between the pixels in the image according to the image feature, the technical solution of this application is not limited thereto. In embodiments consistent with the present application, a person skilled in the art may transform the image feature 410 in any manner to generate an autocorrelation matrix with a dimension of HW*HW. In an example, the image feature 410 may be rearranged first, and the rearranged image feature may then be transformed by using the functions $W_k$ and $W_q$, to obtain two matrices with a dimension of $\tilde{C}*HW$ and with a dimension of $HW*\tilde{C}$ respectively. In another example, one of the functions $W_k$ and $W_q$ may be omitted. In this case, the image feature may be transformed by using the function $W_k$ to obtain the first transformed feature 420, and the first transformed feature 420 is rearranged to obtain the first rearranged feature 440 with a dimension of $\tilde{C}*HW$. The first rearranged feature 440 may then be processed by using another function $W_r$ to obtain the autocorrelation matrix with a dimension of HW*HW. The function $W_r$ may include a convolutional layer.

Figure 5:
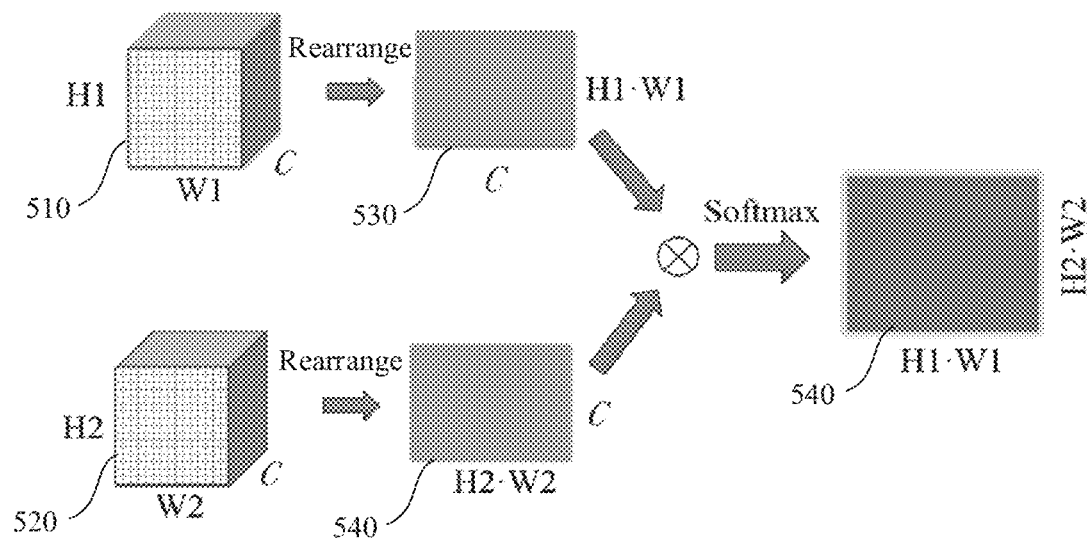
FIG. 5 shows another schematic process of a method for determining correlation of pixels in an image according to an embodiment of this application.

FIG. 5 shows another schematic process of a method for determining correlation of pixels in an image according to an embodiment of this application.

FIG. 5 shows a process of determining correlation between pixels in an image and pixels in another image according to an image feature. An example in which the image is a frame of a video, and another image is an adjacent frame of the frame in the video is used below to describe a principle of this application.

As shown in FIG. 5, an image feature 510 is the image feature of the frame. The image feature 510 may be a result obtained by using step S202. A reference image feature 520 is the image feature of the adjacent frame. In some embodiments, the adjacent frame may be processed by using the method provided in step S202 to obtain the reference image feature 520. For the image feature 510, a size is H1*W1, and a quantity of channels is C. For the reference image feature 520, a size is H2*W2, and a quantity of channels is C. H1 and W1 represent sizes of the image feature in a height direction and a width direction respectively, H2 and W2 represent sizes of the reference image feature in a height direction and a width direction respectively, and the size may be a size in the unit of a quantity of pixels. In an example, the frame and the adjacent frame may be processed separately through the same neural network with the same parameters to determine the image feature 510 and the reference image feature 520. In another example, the frame and the adjacent frame may be processed separately by using different neural networks to determine the image feature 510 and the reference image feature 520. Embodiments of the present application are not limited to a specific obtaining method of the image feature 510 and the reference image feature 520.

As shown in FIG. 5, the image feature 510 and the reference image feature 520 may be rearranged separately to determine a third rearranged feature 530 and a fourth rearranged feature 540. In one embodiment, the third rearranged feature 530 and the fourth rearranged feature 540 may be implemented as a form of a matrix. For example, as shown in FIG. 5, the third rearranged feature 530 and the fourth rearranged feature 540 may be a matrix with a dimension of C*H1W1 and a matrix with a dimension of H2W2*C respectively.

The correlation matrix that indicates the correlation between the pixels in the frame and the pixels in the adjacent frame may be determined by using the third rearranged feature 530 and the fourth rearranged feature 540. In this application, the correlation between the pixels in the frame and the pixels in the adjacent frame may also be referred to as reference cross-frame correlation. For example, matrix multiplication may be performed on the third rearranged feature 530 and the fourth rearranged feature 540 to obtain a cross-frame correlation matrix 550 with a row size of H1W1 and a column size of H2W2.

In some embodiments, elements of each column in a result S' obtained by performing matrix multiplication on the third rearranged feature 530 and the fourth rearranged feature 540 may be normalized, so that a sum of correlation of each pixel in the frame and all pixels in the adjacent frame is 1. The normalization operation may be performed by using a SoftMax function, and a normalized autocorrelation matrix M' may be represented as:

$$M'_{ij} = \frac{\exp(s'_{ij})}{\sum_{j=1}^{n} \exp(s'_{ij})} \quad (1)$$

where $M'_{ij}$ represents an element in the $i^{th}$ row and the $j^{th}$ column in the cross-frame correlation matrix, $S'_{ij}$ represents an element in the $i^{th}$ row and the $j^{th}$ column in the result obtained by performing matrix multiplication on the third rearranged feature and the fourth rearranged feature, and n is a quantity of rows of matrix S, in an example shown in FIG. 5, n=H2*W2.

Although FIG. 5 shows an example of determining the correlation between the pixels in the image according to the image feature, the technical solution of this application is not limited thereto. In embodiments consistent with the present application, a person skilled in the art may transform the image feature 510 and the reference image feature 520 in any manner to generate a cross-frame correlation matrix with a dimension of H1W1*H2W2. In an example, before the image feature 510 and the reference image feature 520 are rearranged, the image feature 510 and the reference image feature 520 may be transformed (for example, by performing linear transformation) by using a function. Next, a transformed image feature and a transformed reference image feature are rearranged to determine the third rearranged feature 530 and the fourth rearranged feature 540. In another example, after the third rearranged feature 530 and the fourth rearranged feature 540 are determined, the third rearranged feature 530 and the fourth rearranged feature 540 may be transformed (for example, by performing linear transformation) separately by using a function. Next, matrix multiplication is performed on a transformed third rearranged feature and a transformed fourth rearranged feature to determine the cross-frame correlation matrix.

Although the image feature 510 and the reference image feature 520 are used as an example to describe the principle of this application in FIG. 5, a person skilled in the art can understand that a corresponding autocorrelation matrix may be determined for the image feature and the reference image feature by using the method shown in FIG. 4, and an updated image feature and an updated reference image feature may be determined according to the corresponding autocorrelation matrix. In this application, the autocorrelation matrix of the reference image feature may also be referred to as reference correlation. In this case, a cross-frame correlation matrix may be determined according to the updated image feature and the updated reference image feature by using the method shown in FIG. 5. In embodiments consistent with the present application, the method provided in FIG. 5 may be used to process two image features including information of two different images, and to obtain a cross-frame correlation matrix between the two images.

Referring to FIG. 2 again, when the image feature of the image is updated by using the correlation between the pixels in the image to obtain the updated image feature, the correlation between the pixels in the image and the pixels in another image may be further considered.

Step S208 may further include determining the reference correlation between the pixels in the image and the pixels in another image according to the updated image feature, and updating the updated image feature by using the reference correlation to obtain a further updated image feature.

An example in which the image is a frame of a video is used, in some embodiments, the reference image feature of an adjacent frame of the frame in the video may be determined, and the reference correlation between the pixels in the adjacent frame may be determined according to the reference image feature. For example, the reference image feature may be processed by using the method shown in FIG. 4 to determine the reference correlation between the pixels in the adjacent frame.

Further, the reference image feature may be updated by using the reference correlation to obtain an updated reference image feature. The reference cross-frame correlation between the pixels in the frame and the pixels in the adjacent frame is determined according to the updated image feature and the updated reference image feature. For example, the updated image feature and the updated reference image feature may be processed by using the method provided in FIG. 5 to determine the reference correlation between the pixels in the frame and the pixels in the adjacent frame. The updated image feature is updated by using the reference correlation to obtain a further updated image feature.

When the further updated image feature is obtained, a detection image feature may be determined according to at least one of the updated image feature and the further updated image feature. In an example, the detection image feature may be the updated image feature or the further updated image feature. In another example, the detection image feature may be a combination of the updated image feature and the further updated image feature. In still another example, the detection image feature may be a combination of an additional image feature and at least one of the updated image feature and the further updated image feature. In some examples, at least one superimposed image feature may be determined according to the updated image feature and the additional image feature by using the foregoing method. Therefore, the detection image feature may alternatively be a combination of the superimposed image feature and at least one of the updated image feature and the further updated image feature.

In some embodiments, for example, a training set for training the neural network used in the foregoing method may be determined, and the training set includes at least one training image. In each training image, an object detection result of the training image has been marked. The training image in the training set may be processed by using the foregoing apparatus provided in this application, and the object detection result (for example, a probability that each pixel pertains to a preset object in the training image) for the training image is obtained.

The following formula may be used as a loss function to train the apparatus provided in this application:

$$L = -\sum_{i,j} [d \log p_{i,j} + (1-d)\log(1-p_{i,j})]$$

where i and j are a horizontal coordinate and a vertical coordinate respectively of an image, and $p\_(i,j)$ is a probability that a pixel in the $i^{th}$ row and the $j^{th}$ column is predicted to be a salient object. d is a truth value, and a value of d may be determined according to a known marked result of the training image. d=1 represents the pixel pertains to a salient object, and d=0 represents the pixel does not pertain to the salient object.

The parameters of each neural network (such as a neural network used for extracting the image feature, a neural network used for implementing linear transformation, and a neural network used for generating a detection result) used in the foregoing method provided in this application may be adjusted by using the foregoing loss function to minimize the value of the loss function.

In some embodiments, a training process may be performed separately for each neural network. In some other embodiments, each neural network may be trained globally.

By using the method provided in this application, object detection may be performed in an image by determining correlation between pixels in the image and/or correlation between pixels in the image and pixels in another image, and based on the determined correlation. By considering characteristics of the foregoing correlation, the accuracy of object detection in the image can be improved, and the speed of a detection algorithm when considering time continuity of a video can be increased.

Figure 6:
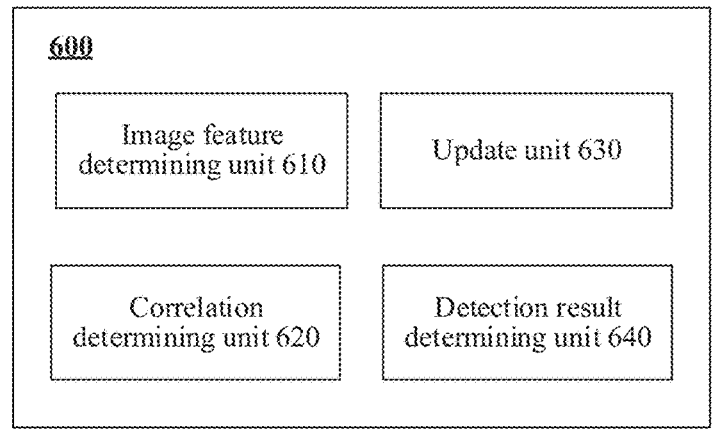
FIG. 6 is a schematic block diagram of an apparatus for object detection in an image according to an embodiment of this application.

FIG. 6 is a schematic block diagram of an apparatus for object detection in an image according to an embodiment of this application.

As shown in FIG. 6, an apparatus 600 may include an image feature determining unit 610, a correlation determining unit 620, an update unit 630, and a detection result determining unit 640.

The image feature determining unit 610 may be configured to determine an image feature of the image. In some embodiments, the image may be inputted into a deep neural network, and an output of the deep neural network may be used as the image feature of the image. In some embodiments, the deep neural network may include an input layer, an intermediate layer including a plurality of convolution layers, and an output layer. A plurality of times of convolution processing performed in the image by using the deep neural network can determine the image feature including semantic information of the image, which achieves object detection in the image. For example, the image may be processed by using a network structure such as a residual network ResNet and a VGG network, and the image feature of the image is determined. A person skilled in the art can understand that this application does not limit a manner for determining the image feature, and may use any machine learning algorithm to determine the image feature, without departing from the principles of this application.

The correlation determining unit 620 may be configured to determine correlation of pixels in the image by using the image feature. The correlation determining unit 620 may include an autocorrelation determining unit and a cross-frame correlation determining unit.

The autocorrelation determining unit may be configured to determine correlation between any pixel in the image and another pixel in the image. In this case, the correlation of the pixels in the image refers to the correlation between the pixels in the image. In an example, when the image is a single image, the correlation between the pixels in the image may refer to the correlation of the pixels within the image. In another example, when the image is a frame of a video, the correlation between the pixels in the image may refer to the correlation of the pixels within the frame. The autocorrelation determining unit may be configured to perform the method of determining the correlation of the pixels in the image shown in FIG. 4 of this application, and details are not described herein again.

The correlation of the pixels in the image refers to inter-image correlation between the pixels in the image and the pixels in another image. Another image may be any image. For example, when the image is a frame of a video, the cross-frame correlation determining unit may be configured to determine the correlation between the pixels in the frame of the video and the pixels in the adjacent frame of the video, that is, the correlation of cross-frame pixels. For example, the cross-frame correlation determining unit may be configured to determine a reference image feature of the adjacent frame, and determine the correlation between pixels in the frame and pixels in the adjacent frame according to the image feature and the reference image feature. In this case, the correlation of the pixels in the frame refers to the correlation between the pixels in the frame and the pixels in another frame of the video. The cross-frame correlation determining unit may be configured to perform the method of determining the correlation of the pixels in the image shown in FIG. 5 of this application, and details are not described herein again.

Another frame of the video may refer to an adjacent frame (such as a previous frame or a next frame) of the frame of the video, or may refer to a frame that is not adjacent to, but is related to, the frame of the video, for example, any frame that is similar to the frame of the video. The "similar" may refer to display of similar objects, colors, composition, and the like. By considering the correlation between the pixels in the frame of the video and the pixels in another frame of the video, information transmission between different frames can be achieved. Missing visual information of some frames may be added and restored by using information of other frames to achieve enhancement and integration of detection results.

In some embodiments, the correlation of the pixels in the image may be represented as a form of a correlation matrix, and a value of each element in the correlation matrix may be used to indicate a magnitude of the correlation between two pixels. As can be understood, the correlation of the pixels in the image may alternatively be represented in any other manners.

The update unit 630 may be configured to update the image feature of the image by using the correlation to obtain an updated image feature.

In some embodiments, the image feature determined by the image feature determining unit 610 may be updated by using the correlation of the pixels in the image determined by the correlation determining unit 620, so that the updated image feature can be obtained for further detection steps. The updated image feature integrates semantic information of the image and correlation information about the pixels in the image. When the correlation of the pixels in the image includes the correlation between each of the pixels in the image, the image feature is updated by using the correlation, which can fully consider a global feature of the image, thereby improving the accuracy of object detection. When the correlation of the pixels in the image includes the correlation between the pixels in the image and the pixels in another image, the image feature is updated by using the correlation, which can achieve information transmission between different images. For example, when the foregoing correlation is the correlation between pixels of two adjacent frames of a video, the image feature is updated by using the correlation. The updated image feature reflects time continuity between different frames of the video, thereby improving the accuracy of object detection.

When the correlation of the pixels in the image is represented as the correlation matrix, the image feature may be multiplied by the correlation matrix to obtain the updated image feature.

When the image feature is represented as a tensor form with a size of H*W and a quantity of channels of C, the image feature may be multiplied by the correlation matrix through the following process: the image feature may be rearranged, and the image feature in a form of a three-dimensional tensor is compressed into a form of a two-dimensional image feature matrix with a dimension of HW*C. The rearranged image feature may be matrix multiplied by the correlation matrix to obtain an updated image feature matrix. Next, an inverse operation of rearrangement may be performed on the updated image feature matrix to obtain the updated image feature. H and W represent sizes of the image feature in a height direction and a width direction respectively, and the size may be a size in the unit of a quantity of pixels.

In a process of rearranging the image feature tensor with the size of H*W and the quantity of channels of C into the two-dimensional image feature matrix of HW*C, a quantity of elements in the image feature does not change. Therefore, each element in the image feature tensor may be mapped to the two-dimensional image feature matrix according to a preset order, thereby achieving rearrangement. In this case, each element in the two-dimensional image feature matrix may also be mapped back to the image feature tensor according to a mapping rule of rearrangement, thereby achieving an inverse operation of rearrangement.

The detection result determining unit 640 may be configured to determine an object detection result in the image according to the updated image feature. The object detection result may include a probability that each pixel in the image pertains to an object of a preset type.

In some embodiments, the detection result determining unit 640 may determine the detection image feature at least based on the updated image feature, and the object detection result of the image may then be generated according to the detection image feature.

In some embodiments, the object detection result of the image may be generated in a corresponding manner of determining the image feature of the image by the image feature determining unit 610. For example, if the image feature determining unit 610 uses a convolutional neural network to process the image and obtains the image feature of the image, the detection result determining unit 640 may correspondingly use the convolutional neural network to process the detection image feature, to obtain the object detection result of the image. If the image feature determining unit 610 uses another method to obtain the image feature of the image, the detection result determining unit 640 also uses a corresponding method to process the detection image feature, to obtain the object detection result of the image.

In some embodiments, a detection result graph of the image may be determined according to the object detection result. For each pixel in the detection result graph, a corresponding pixel of the pixels in the image and a probability that the corresponding pixel pertains to an object of a preset type are determined, and a pixel value of the pixel is determined according to the probability. For example, when the probability that the corresponding pixel pertains to the object of the preset type is greater than (or equal to) a preset threshold (for example, 0.5, or any other probability value), the pixel value of the pixel may be determined as a first value (for example, 1). When the probability that the corresponding pixel pertains to the object of the preset type is less than the preset threshold, the pixel value of the pixel may be determined as a second value (for example, 0). A person skilled in the art may determine a magnitude of the preset threshold and values of the first value and the second value.

The processed image may be further processed by using the foregoing determined detection result graph. For example, specific information such as advertisements and notices may be displayed to a user in a display region determined to be a salient object, thereby increasing a probability of the user viewing the specific information.

In some embodiments, the detection image feature may include at least the updated image feature. In one embodiment, the detection image feature may be the updated image feature determined by the update unit 630. In another implementation, the detection image feature may be determined according to the updated image feature and an additional image feature of the image. In some embodiments, the additional image feature may be any one of the pyramid features $P_1, P_2, \ldots$, and $P_{n-1}$ determined in step S202. In some embodiments, the additional image feature may be any other feature determined according to the method provided in step S202.

In an example, the updated image feature and the additional image feature of the image may be combined to determine the detection image feature. For example, the updated image feature and the additional image feature of the image may be connected in a channel dimension to determine the detection image feature. A person skilled in the art can understand that the updated image feature and the additional image feature may alternatively be combined in any other manner. As long as information of the updated image feature and information of the additional image feature can be integrated, this is not limited to a specific method of combination.

In another example, the updated image feature may be superimposed on at least one additional image feature to obtain at least one superimposed image feature, and the updated image feature and the at least one superimposed image feature are combined to determine the detection image feature. For example, the updated image feature and the superimposed image feature may be connected in a channel dimension to determine the detection image feature.

When sizes and quantities of channels of the updated image feature and the additional image feature to be superimposed are the same, values of corresponding elements in the updated image feature and the additional image feature may be added to obtain the superimposed image feature. When sizes and quantities of channels of the updated image feature and the additional image feature are different, upsampling/downsampling may be performed on at least one of the updated image feature and the additional image feature to equalize the sizes of the updated image feature and the additional image feature, and at least one of the updated image feature and the additional image feature may further be processed by using a convolution kernel with a size of 1×1 to equalize the quantities of channels of the updated image feature and the additional image feature. The updated image feature and the additional image feature can have the same size and quantity of channels by using such method, and the superimposed image feature can be obtained by the method of adding the values of corresponding elements.

In some embodiments, the detection result determining unit 640 may be further configured to determine the reference correlation between the pixels in the image and the pixels in another image according to the updated image feature, and update the updated image feature by using the reference correlation to obtain a further updated image feature.

An example in which the image is a frame of a video is used, the reference image feature of an adjacent frame of the frame in the video may be determined, and the reference correlation between the pixels in the adjacent frame may be determined according to the reference image feature. For example, the reference image feature may be processed by using the method shown in FIG. 4 to determine the reference correlation between the pixels in the adjacent frame.

Further, the reference image feature may be updated by using the reference correlation to obtain an updated reference image feature. The reference cross-frame correlation between the pixels in the frame and the pixels in the adjacent frame is determined according to the updated image feature and the updated reference image feature. For example, the updated image feature and the updated reference image feature may be processed by using the method provided in FIG. 5 to determine the reference correlation between the pixels in the frame and the pixels in the adjacent frame. The updated image feature is updated by using the reference correlation to obtain a further updated image feature.

When the further updated image feature is obtained, a detection image feature may be determined according to at least one of the updated image feature and the further updated image feature. In an example, the detection image feature may be the updated image feature or the further updated image feature. In another example, the detection image feature may be a combination of the updated image feature and the further updated image feature. In still another example, the detection image feature may be a combination of an additional image feature and at least one of the updated image feature and the further updated image feature. In some examples, at least one superimposed image feature may be determined according to the updated image feature and the additional image feature by using the foregoing method. Therefore, the detection image feature may alternatively be a combination of the superimposed image feature and at least one of the updated image feature and the further updated image feature.

Figure 7A:
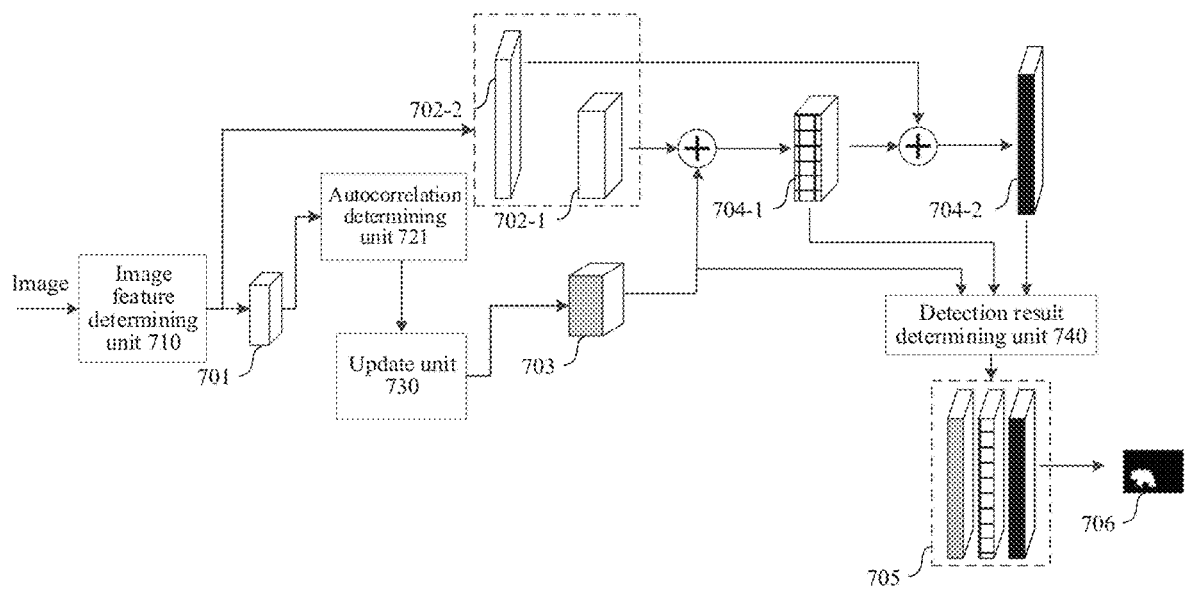
FIG. 7A shows a schematic process of performing object detection on an image according to an embodiment of this application.

FIG. 7A shows a schematic process of performing object detection on an image according to an embodiment of this application.

As shown in FIG. 7A, an image feature 701 and two additional image features 702-1 and 702-2 may be determined by using an image feature determining unit 710. The image feature 701 may be processed by using an autocorrelation determining unit 721 to determine correlation between pixels in the image. The autocorrelation determining unit 721 may be configured to perform the method of determining the correlation of the pixels in the image shown in FIG. 4 of this application, and details are not described herein again. Next, the image feature may be updated according to a result determined by the autocorrelation determining unit 721 by using an update unit 730 to obtain an updated image feature 703. Next, an object detection result of the image may be determined according to the updated image feature 703 and the additional image features 702-1 and 702-2 by using a detection result determining unit 740. For example, as shown in FIG. 7A, a superimposed image feature 704-1 may be obtained by superimposing the updated image feature 703 on the additional image feature 702-1, a superimposed image feature 704-2 may be obtained by superimposing the superimposed image feature 704-1 on the additional image feature 702-2, and the detection result determining unit 740 may be used to connect the updated image feature 703 and the superimposed image features 704-1 and 704-2 in a channel dimension to determine a detection image feature 705. The detection result determining unit 740 may perform, for example, a convolutional operation on the detection image feature 705 to generate a final object detection result 706.

Figure 7B:
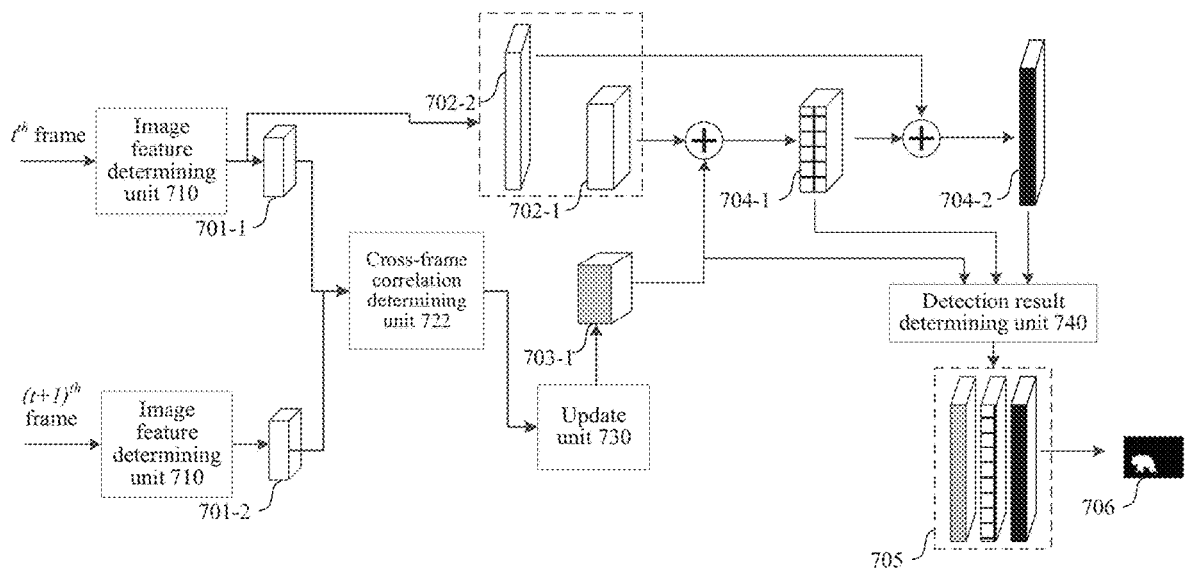
FIG. 7B shows a schematic process of performing object detection on an image according to an embodiment of this application.

FIG. 7B shows a schematic process of performing object detection on an image according to an embodiment of this application. In FIG. 7B, a $t^{th}$ frame and a $(t+1)^{th}$ frame of a video are used as an example to describe a process of determining object detection on the frame of the video by using cross-frame correlation, where t is a positive integer.

As shown in FIG. 7B, an image feature 701-1 of the $t^{th}$ frame and an image feature 701-2 of the $(t+1)^{th}$ frame may be determined by using an image feature determining unit 710. In some embodiments, additional image features 702-1 and 702-2 of the $t^{th}$ frame may also be determined by using the image feature determining unit 710. The image features 701-1 and 701-2 may be processed by using a cross-frame correlation determining unit 722 to determine correlation between the $t^{th}$ frame and the $(t+1)^{th}$ frame. The cross-frame correlation determining unit 722 may use the method shown in FIG. 5 of this application to process the image features 701-1 and 701-2, and details are not described herein again. A cross-frame correlation matrix for the $t^{th}$ frame may be determined by using the cross-frame correlation determining unit 722.

Further, an update unit 730 may update the image feature 701-1 by using the cross-frame correlation matrix determined by the cross-frame correlation determining unit 722 to obtain an updated image feature 703-1. Next, superimposed image features 704-1 and 704-2 may be determined based on the updated image feature 703-1 and the additional image features 702-1 and 702-2 and according to a process similar to the method shown in FIG. 7A. A detection result determining unit 740 may be configured to connect the updated image feature 703-1 and the superimposed image features 704-1 and 704-2 in a channel dimension to determine a detection image feature 705, and a final detection result 706 may be obtained based on the detection image feature 705.

Figure 7C:
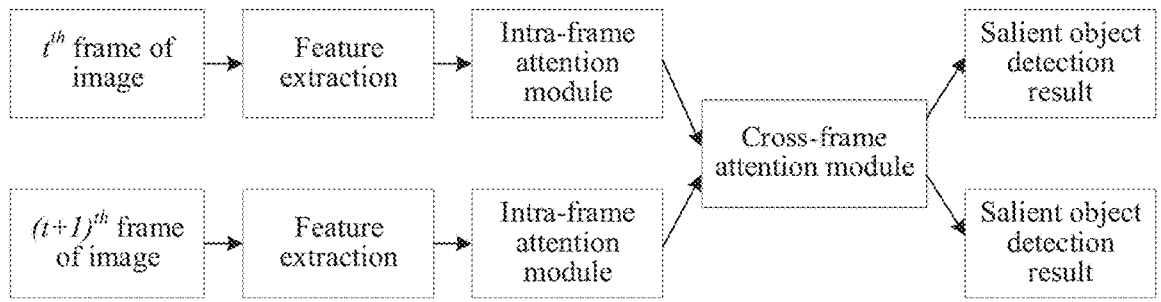
FIG. 7C shows another schematic process of performing object detection on an image according to an embodiment of this application.

FIG. 7C shows another schematic process of performing object detection on an image according to an embodiment of this application. As shown in FIG. 7C, a $t^{th}$ frame and a $(t+1)^{th}$ frame of a video are used as an example, feature extraction may be performed on the $t^{th}$ frame and the (t+1)th frame separately to obtain image features of the $t^{th}$ frame and the $(t+1)^{th}$ frame, and an intra-frame attention module is configured to update the image features of the $t^{th}$ frame and the $(t+1)^{th}$ frame separately to determine updated image features of the $t^{th}$ frame and the $(t+1)^{th}$ frame. Next, the updated image features of the $t^{th}$ frame and the $(t+1)^{th}$ frame may be further processed by using a cross-frame attention module to determine further updated image features of the $t^{th}$ frame and the $(t+1)^{th}$ frame. According to the further updated image features of the $t^{th}$ frame and the $(t+1)^{th}$ frame, object detection results, for example, salient object detection results, of the $t^{th}$ frame and the $(t+1)^{th}$ frame of image may be determined separately.

The intra-frame attention module may include the foregoing autocorrelation determining unit and update unit of this application. The cross-frame attention module may include the foregoing cross-frame correlation determining unit and update unit of this application. One embodiment of object detection on the image shown in FIG. 7C is described below with reference to FIG. 7D.

Figure 7D:
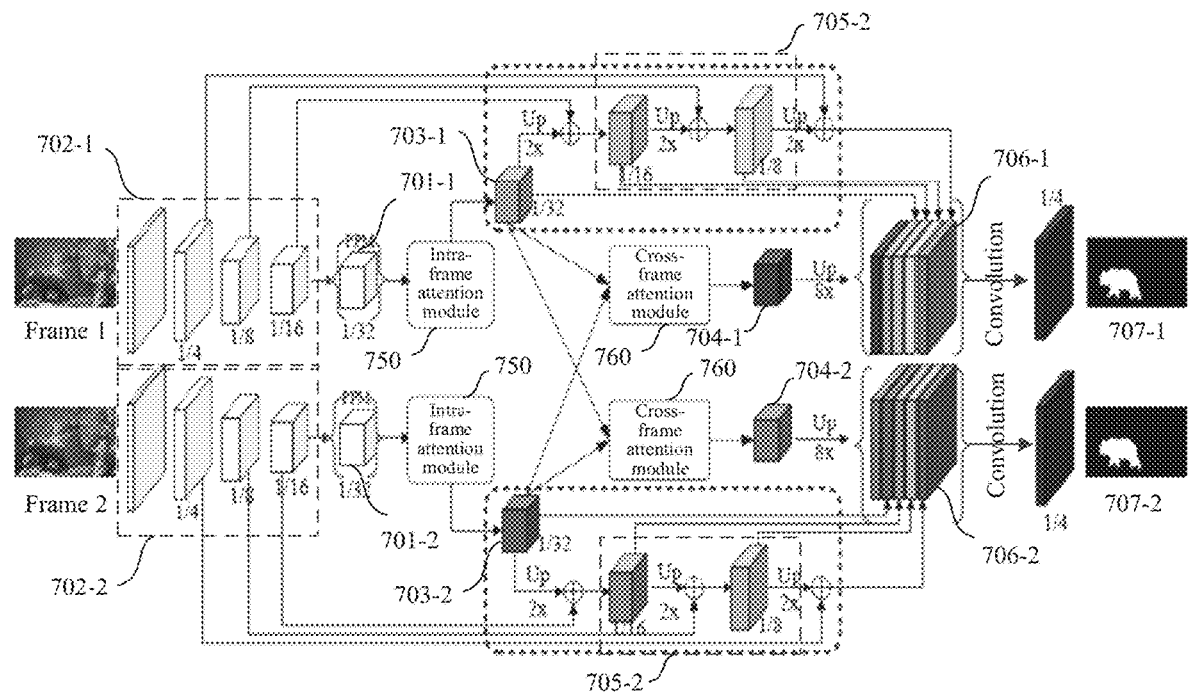
FIG. 7D shows an embodiment of performing object detection on an image according to FIG. 7C.

FIG. 7D shows an embodiment of performing object detection on an image according to FIG. 7C.

As shown in FIG. 7D, image features 701-1 and 701-2 and at least one additional image feature set 702-1 and 702-2 of frame 1 and frame 2 may be determined separately by using, for example, an image feature determining unit provided in this application. Each additional image feature set includes three additional image features with different sizes, as shown in FIG. 7D, the additional image features with sizes of ¼, ⅛, and 1/16 of an original frame. The image feature 701-1 of frame 1 may be processed by using an intra-frame attention module 750. The intra-frame attention module 750 may include the autocorrelation determining unit and the update unit provided in this application. The image feature 701-1 may be updated by the autocorrelation determining unit and the update unit using the methods provided in FIG. 4 and FIG. 7A to obtain an updated image feature 703-1. By a similar method, the image feature 701-2 of frame 2 may be processed by using the intra-frame attention module 750, and then the image feature 701-2 is updated, to obtain an updated image feature 703-2.

Next, the updated image feature 703-1 and the updated image feature 703-2 may be processed by using a cross-frame attention module 760. The cross-frame attention module 760 may include the cross-frame correlation determining unit and the update unit provided in this application. The updated image feature 703-1 and the updated image feature 703-2 may be updated by using the methods provided in FIG. 5 and FIG. 7B to determine further updated image features 704-1 and 704-2.

Further, the updated image feature 703-1 may be superimposed on each additional image feature in the additional image feature set 702-1 to determine a superimposed image feature set 705-1. Similarly, the updated image feature 703-2 may be superimposed on each additional image feature in the additional image feature set 702-2 to determine a superimposed image feature set 705-2. Because the size of the updated image feature is 1/32 of the size of original frame 1, and is different from the size of each additional image feature, when the updated image feature 703-2 and each additional image feature in the additional image feature set 702-2 are superimposed, upsampling or downsampling may be performed on the updated image feature 703-2 and each additional image feature in the additional image feature set 702-2 according to actual conditions, to equalize the sizes of the updated image feature 703-2 and each additional image feature in the additional image feature set 702-2 that are to be superimposed.

For the frame 1, a detection image feature 706-1 including the updated image feature 703-1, the superimposed image feature set 705-1, and the further updated image feature 704-1 may be determined, and a detection result 707-1 for the frame 1 may be obtained according to the detection image feature 706-1. Similarly, for the frame 2, a detection image feature 706-2 including the updated image feature 703-2, the superimposed image feature set 705-2, and the further updated image feature 704-2 may be determined, and a detection result 707-2 for the frame 2 may be obtained according to the detection image feature 706-2. Similarly, because the sizes of the updated image feature 703-2 and each additional image feature in the additional image feature set 702-2 are different, the size of each superimposed image feature in the generated superimposed image feature set is also different from one another. Therefore, when the detection image feature 706-1 is generated, upsampling (not shown) may be performed on at least one of each superimposed image feature in the superimposed image feature set, the updated image feature 703-1, and the further updated image feature 704-1, so that a connection operation in a channel dimension can be performed on each superimposed image feature in the superimposed image feature set, the updated image feature 703-1, and the further updated image feature 704-1 that have a unified size, to determine the detection image feature 706-1. The detection image feature 706-2 may be generated by using a similar method.

In some embodiments, for example, a training set for training the foregoing apparatus may be determined, and the training set includes at least one training image. In each training image, an object detection result of the training image has been marked. The training image in the training set may be processed by using the foregoing apparatus provided in this application, and the object detection result (for example, a probability that each pixel pertains to a preset object in the training image) for the training image is obtained.

The following formula may be used as a loss function to train the apparatus provided in this application:

$$L = -\sum_{i,j} [d \log p_{i,j} + (1-d)\log(1-p_{i,j})]$$

where i and j are a horizontal coordinate and a vertical coordinate respectively of an image, and p_(ij) is a probability that a pixel in the $i^{th}$ row and the $j^{th}$ column is predicted to be a salient object. d is a truth value, and a value of d may be determined according to a known marked result of the training image. d=1 represents the pixel pertains to a salient object, and d=0 represents the pixel does not pertain to the salient object.

The parameters of each neural network (such as a neural network used for extracting the image feature, a neural network used for implementing linear transformation, and a neural network used for generating a detection result) included in the foregoing apparatus provided in this application may be adjusted by using the foregoing loss function to minimize the value of the loss function, thereby implementing the training of the foregoing apparatus.

In embodiments consistent with this application, object detection may be performed in an image by determining correlation between pixels in the image and/or correlation between pixels in the image and pixels in another image, and based on the determined correlation. By considering characteristics of the foregoing correlation, the accuracy of object detection in the image can be improved, and the speed of a detection algorithm when considering time continuity of a video can be increased.

Figure 8:
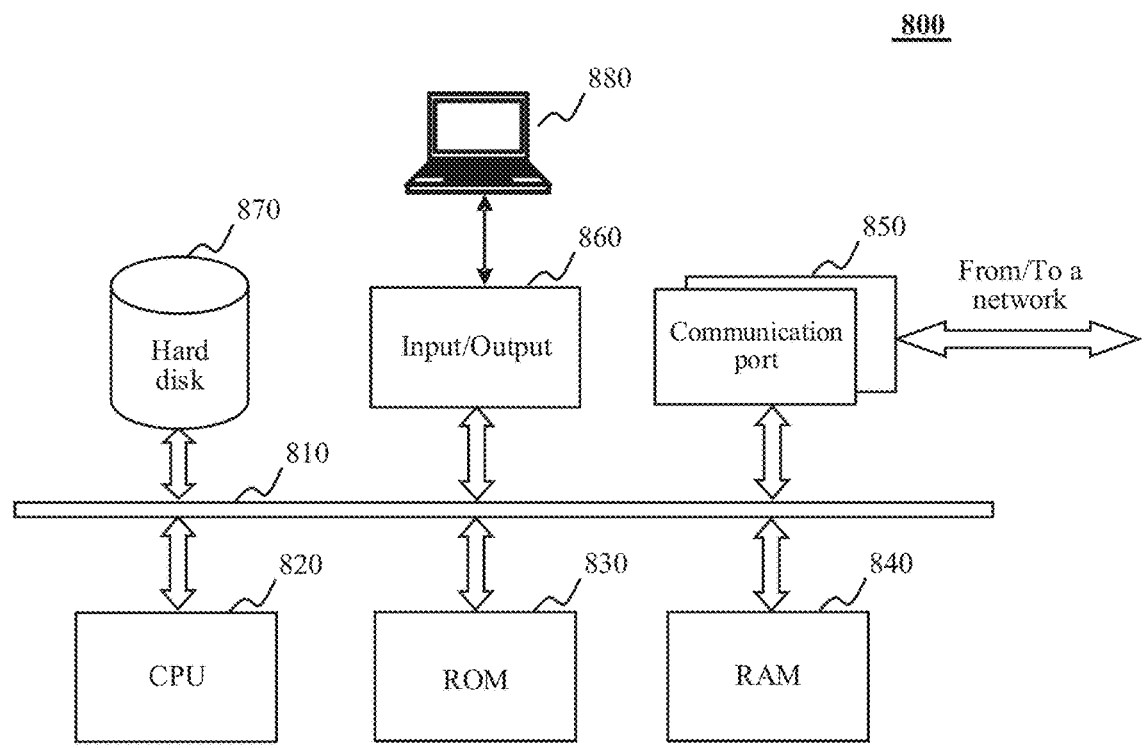
FIG. 8 is an architecture of a computing device according to an embodiment of this application.

In addition, the method or apparatus according to the embodiments of this application may alternatively be implemented by using an architecture of a computing device shown in FIG. 8. FIG. 8 shows an architecture of the computing device. As shown in FIG. 8, the computing device 800 may include a bus 810, one or at least two CPUs 820, a read-only memory (ROM) 830, a random access memory (RAM) 840, a communication port 850 connected to a network, an input/output component 860, a hard disk 870, and the like. A storage device, for example, the ROM 830 or the hard disk 870, in the computing device 800 may store various data or files used in processing and/or communication in the method for detecting a target in a video provided in this application and program instructions executed by the CPU. The computing device 800 may further include a user interface 880. Certainly, the architecture shown in FIG. 8 is only exemplary, and when different devices are implemented, one or at least two components in the computing device shown in FIG. 8 may be omitted according to an actual need.

The embodiments of this application may alternatively be implemented as a vehicle. The vehicle according to the embodiments of this application may include an image sensor configured to capture an image or a video, a memory configured to store an instruction, and a processor. The processor performs the method according to the embodiments of this application described with reference to the foregoing accompanying drawings on the captured image or the captured video frame by executing the instruction.

The embodiments of this application may alternatively be implemented as a robot. The robot according to the embodiments of this application may include an image sensor configured to capture an image or a video, a memory configured to store an instruction, and a processor. The processor performs the method according to the embodiments of this application described with reference to the foregoing accompanying drawings on the captured image or the captured video frame by executing the instruction.

The embodiments of this application may alternatively be implemented as a monitoring device. The monitoring device according to the embodiments of this application may include an image sensor configured to capture an image or a video, a memory configured to store an instruction, and a processor. The processor performs the method according to the embodiments of this application described with reference to the foregoing accompanying drawings on the captured image or the captured video frame by executing the instruction.

The embodiments of this application may alternatively be implemented as a computer-readable storage medium. The computer-readable storage medium according to the embodiments of this application stores a computer-readable instruction. The computer-readable instruction, when executed by a processor, may perform the method according to the embodiments of this application described with reference to the foregoing accompanying drawings. The computer-readable storage medium includes, but is not limited to, a volatile memory and/or a non-volatile memory. For example, the volatile memory may include a RAM and/or a high-speed cache. For example, the non-volatile memory may include a ROM, a hard disk, and a flash memory.

The term unit, and other similar terms such as subunit, module, submodule, etc., in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person skilled in the art can understand that, content disclosed in this application may have various variations and improvements. For example, the devices or components described above may be implemented by using hardware, or may be implemented by using software, firmware, or a combination of some of or all of the software, the firmware, and the hardware.

In addition, as shown in this application and the claims, words such as "a/an", "one", "one kind", and/or "the" do not refer specifically to singular forms and may also include plural forms, unless the context expressly indicates an exception. In general, terms "comprise" and "include" merely indicate including clearly identified steps and elements. The steps and elements do not constitute an exclusive list. A method or a device may also include other steps or elements.

In addition, although this application makes various references to some units in the system according to the embodiments of this application, any quantity of different units may be used and run on a client and/or a server. The units are only illustrative, and different aspects of the system and method may use different units.

In addition, flowcharts are used in this application for illustrating operations performed by the system according to the embodiments of this application. It is to be understood that, the foregoing or following operations are not necessarily strictly performed according to an order. On the contrary, the operations may be performed in a reverse order or simultaneously. Meanwhile, other operations may be added to the processes. Alternatively, one or more operations may be deleted from the processes.

Unless otherwise defined, all terms (including technical and scientific terms) used herein have the same meaning as commonly understood by one of ordinary skill in the art to which this application belongs. It is further to be understood that, the terms such as those defined in commonly used dictionaries are to be interpreted as having meanings that are consistent with the meanings in the context of the related art, and are not to be interpreted in an idealized or extremely formalized sense, unless expressively so defined herein.

The above is description of this application, and is not to be considered as a limitation to this application. Although several exemplary embodiments of this application are described, a person skilled in the art may easily understand that, many changes can be made to the exemplary embodiments without departing from novel teaching and advantages of this application. Therefore, the changes are intended to be included within the scope of this application as defined by the claims. It is to be understood that, the above is description of this application, and is not to be considered to be limited by the disclosed specific embodiments, and modifications to the disclosed embodiments and other embodiments fall within the scope of the appended claims. This application is subject to the claims and equivalents thereof.

What is claimed is:

1. A method for object detection in an image, performed by a computing device, the method comprising:
   determining an image feature of an image, the image being a frame of a video;
   determining a correlation of pixels in the image based on the image feature, comprising:
       rearranging the image feature of the image to obtain a rearranged frame feature;
       determining a reference image feature of an adjacent frame of the frame in the video, and rearranging the reference image feature to obtain a rearranged reference feature; and
       determining the correlation between the pixels in the frame and the pixels in the adjacent frame according to the rearranged frame feature and the rearranged reference feature;
   updating the image feature of the image based on the correlation to obtain an updated image feature; and
   determining an object detection result in the image according to the updated image feature.

2. The method according to claim 1, wherein the determining correlation of pixels in the image based on the image feature comprises:
   determining the correlation between the pixels in the image according to the image feature.

3. The method according to claim 1, wherein the determining correlation of pixels in the image comprises:
   performing first linear transformation on the image feature to obtain a first transformed feature;
   performing second linear transformation on the image feature to obtain a second transformed feature;
   rearranging the first transformed feature to obtain a first rearranged feature;
   rearranging the second transformed feature to obtain a second rearranged feature; and
   determining the correlation between the pixels in the image according to the first rearranged feature and the second rearranged feature.

4. The method according to claim 3, wherein the determining the correlation between the pixels in the image according to the first rearranged feature and the second rearranged feature comprises:

determining an autocorrelation matrix of the image according to the first rearranged feature and the second rearranged feature; and normalizing elements of each column in the autocorrelation matrix to obtain the correlation between the pixels in the image.

5. The method according to claim 1, wherein the determining the correlation between the pixels in the frame and the pixels in the adjacent frame according to the rearranged frame feature and the rearranged reference feature comprises:

determining a cross-frame correlation matrix between the pixels in the frame and the pixels in the adjacent frame according to the rearranged frame feature and rearranged reference feature; and normalizing elements of each column in the cross-frame correlation matrix to obtain the correlation between the pixels in the frame and the pixels in the adjacent frame.

6. The method according to claim 1, wherein the updating the image feature of the image based on the correlation to obtain an updated image feature comprises:

multiplying the correlation with the image feature to obtain the updated image feature.

7. The method according to claim 1, wherein the determining an object detection result in the image according to the updated image feature comprises:

determining a detection image feature at least according to the updated image feature; and determining the object detection result according to the detection image feature.

8. The method according to claim 7, wherein the detection image feature is determined by:

determining an additional image feature of the image, each of the additional image feature being different from one another;

superimposing the updated image feature on each of the additional image feature to determine a superimposed image feature; and combining the updated image feature and the superimposed image feature to determine the detection image feature.

9. The method according to claim 2, wherein the determining an object detection result in the image according to the updated image feature comprises:

determining reference correlation between pixels in the adjacent frame according to the reference image feature;

updating the reference image feature based on the reference correlation to obtain an updated reference image feature;

determining reference cross-frame correlation between pixels in the frame and pixels in the adjacent frame according to the updated image feature and the updated reference image feature;

updating the updated image feature based on the reference cross-frame correlation to obtain a further updated image feature; and determining the object detection result in the frame according to the further updated image feature.

10. The method according to claim 9, wherein the determining the object detection result in the frame according to the further updated image feature comprises:

determining at least an image feature of the image, each of the additional image feature being different from one another;

superimposing the updated image feature on each of the additional image feature to determine a superimposed image feature;

combining the updated image feature, the further updated image feature, and the superimposed image feature to determine the detection image feature; and determining the object detection result according to the detection image feature.

11. The method according to claim 7, wherein the object detection result comprises a probability that each pixel in the image pertains to an object of a preset type.

12. The method according to claim 10, further comprising determining a detection result graph of the image according to the object detection result, wherein for each pixel in the detection result graph, determining a corresponding pixel in the image and a probability that the corresponding pixel pertains to an object of a preset type, and determining a pixel value of the pixel according to the probability.

13. An object detection device, comprising:

an image sensor, configured to capture an image;

at least one memory, configured to store an instruction; and at least one processor, configured to execute the instruction and perform:

determining an image feature of an image, the image being a frame of a video;

determining a correlation of pixels in the image based on the image feature, comprising:

rearranging the image feature of the image to obtain a rearranged frame feature;

determining a reference image feature of an adjacent frame of the frame in the video, and rearranging the reference image feature to obtain a rearranged reference feature; and determining the correlation between the pixels in the frame and the pixels in the adjacent frame according to the rearranged frame feature and the rearranged reference feature;

updating the image feature of the image based on the correlation to obtain an updated image feature; and determining an object detection result in the image according to the updated image feature.

14. The object detection device according to claim 13, wherein the determining correlation of pixels in the image based on the image feature comprises:

determining the correlation between the pixels in the image according to the image feature.

15. The object detection device according to claim 13, wherein the determining correlation of pixels in the image comprises:

performing first linear transformation on the image feature to obtain a first transformed feature;

performing second linear transformation on the image feature to obtain a second transformed feature;

rearranging the first transformed feature to obtain a first rearranged feature;

rearranging the second transformed feature to obtain a second rearranged feature; and determining the correlation between the pixels in the image according to the first rearranged feature and the second rearranged feature.

16. A non-transitory computer-readable storage medium, storing an instruction, the instruction, when executed by at least one processor, causing the at least one processor to perform:

determining an image feature of an image, the image being a frame of a video;

determining a correlation of pixels in the image based on the image feature, comprising:

rearranging the image feature of the image to obtain a rearranged frame feature;

determining a reference image feature of an adjacent frame of the frame in the video, and rearranging the reference image feature to obtain a rearranged reference feature; and determining the correlation between the pixels in the frame and the pixels in the adjacent frame according to the rearranged frame feature and the rearranged reference feature;

updating the image feature of the image based on the correlation to obtain an updated image feature; and determining an object detection result in the image according to the updated image feature.

17. The computer-readable storage medium according to claim 16, wherein the determining correlation of pixels in the image based on the image feature comprises:

determining the correlation between the pixels in the image according to the image feature.

\* \* \* \* \*